(12) United States Patent
Jing et al.

(10) Patent No.: US 12,497,941 B2
(45) Date of Patent: Dec. 16, 2025

(54) DEVICE, SYSTEM AND METHOD FOR ISOTHERMAL COMPRESSION, CONSTANT-PRESSURE POWER GENERATION AND PHYSICAL ENERGY STORAGE

(71) Applicants: Xi'an Thermal Power Research Institute Co., Ltd, Xi'an (CN); Northwestern Polytechnical University, Xi'an (CN)

(72) Inventors: Xiaolei Jing, Shaanxi (CN); Cunliang Liu, Shaanxi (CN); Yuwen Lin, Shaanxi (CN); Dangqi Xu, Shaanxi (CN); Liang Zhao, Shaanxi (CN); Shuting Liang, Shaanxi (CN)

(73) Assignees: Xi'an Thermal Power Research Institute Co., Ltd, Xi'an (CN); Northwestern Polytechnical University, Xi'an (CN)

( * ) Notice: Subject to any disclaimer, the term of this patent is extended or adjusted under 35 U.S.C. 154(b) by 220 days.

(21) Appl. No.: 18/434,103

(22) Filed: Feb. 6, 2024

(65) Prior Publication Data
US 2024/0271590 A1    Aug. 15, 2024

(30) Foreign Application Priority Data
Feb. 13, 2023    (CN) .......................... 202310105663.9

(51) Int. Cl.
*F03B 13/06*    (2006.01)
*F15B 1/04*    (2006.01)
*F15B 1/10*    (2006.01)

(52) U.S. Cl.
CPC .............. *F03B 13/06* (2013.01); *F15B 1/045* (2013.01); *F15B 1/106* (2013.01);
(Continued)

(58) Field of Classification Search
CPC ........ F03B 13/06; F03B 17/005; F15B 1/045; F15B 1/10; F15B 1/106; F15B 2201/205;
(Continued)

(56) References Cited

U.S. PATENT DOCUMENTS 6,295,813 B1 * 10/2001 Stenquist .................. B30B 1/32
                                                       92/52
8,161,741 B2 * 4/2012 Ingersoll .................. F02C 6/16
                                                       417/396
(Continued)

FOREIGN PATENT DOCUMENTS

CN    102619668 A  *  8/2012
CN    114776410 B  *  9/2022    ............. F28D 20/00

*Primary Examiner* — Michael Leslie
(74) *Attorney, Agent, or Firm* — Maginot, Moore & Beck, LLP

(57) ABSTRACT

A device for isothermal compression, constant-pressure power generation and physical energy storage includes an air storage tank, a weight, a piston and a piston rod. An inner cavity of the air storage tank is divided into first to third chambers by first and second heat conducting baffles. The piston is arranged in the second chamber. The piston rod has a lower end connected with the piston and an upper end connected with the weight. First and second elastic sealing belts are arranged in the first and third chambers, respectively. The first chamber includes a first water injection port and a first water outlet above the first elastic sealing belt, and the third chamber includes a second water injection port and a second water outlet above the second elastic sealing belt. A bottom of the air storage tank includes an air injection port and a compressed air outlet.

8 Claims, 3 Drawing Sheets

(52) U.S. Cl.
CPC ..... *F05B 2260/42* (2013.01); *F15B 2201/205* (2013.01); *F15B 2201/215* (2013.01); *F15B 2201/315* (2013.01); *F15B 2201/32* (2013.01); *F15B 2201/413* (2013.01); *F15B 2201/415* (2013.01); *F15B 2201/42* (2013.01)

(58) Field of Classification Search
CPC .......... F15B 2201/215; F15B 2201/315; F15B 2201/32; F15B 2201/413; F15B 2201/415; F15B 2201/4155; F15B 2201/42
See application file for complete search history.

(56) References Cited

U.S. PATENT DOCUMENTS

| | | | |
|---|---|---|---|
| 8,646,484 B2 * | 2/2014 | Stroganov | F15B 1/24 |
| | | | 138/31 |
| 9,234,530 B1 * | 1/2016 | Sneddon | F28D 15/00 |
| 10,233,897 B2 * | 3/2019 | Stenzel | F03B 17/025 |
| 10,527,065 B2 * | 1/2020 | Karamanev | F15B 1/103 |
| 10,920,795 B2 * | 2/2021 | Plamondon | F15B 1/265 |
| 11,480,198 B2 * | 10/2022 | Groben | F16L 55/053 |
| 12,031,556 B2 * | 7/2024 | Maro | F15B 1/24 |
| 12,116,970 B2 * | 10/2024 | Pedretti-Rodi | F03B 17/02 |

* cited by examiner

DEVICE, SYSTEM AND METHOD FOR ISOTHERMAL COMPRESSION, CONSTANT-PRESSURE POWER GENERATION AND PHYSICAL ENERGY STORAGE

CROSS-REFERENCE TO RELATED APPLICATION

This application is based on and claims priority to Chinese Patent Application No. 202310105663.9 filed on Feb. 13, 2023, the entire contents of which are incorporated herein by reference for all purposes.

FIELD

The present disclosure relates to a field of air compression energy storage and power generation, and particularly relates to a device, a system and a method for isothermal compression, constant-pressure power generation and physical energy storage.

BACKGROUND

At present, the compressed-air energy storage technology is complex, and its implementation techniques are very different from those of the pumped storage. The pumped storage only stores electric energy in the form of water potential energy, with a fixed target, a clear principle and mature equipment manufacturing and operation technologies. In the operation process of the compressed-air energy storage, on the one hand, the fluctuation of air pressure potential energy causes energy loss, and there is a lot of heat exchange, thus leading to a violent fluctuation of air temperature, which in turn affects the air pressure. Generally, under the same volume, the temperature of the air with the same amount of substance is directly proportional to the pressure thereof. Once the temperature rises during compression, more energy will be consumed than that during an isothermal change, while once the temperature drops during power generation, less energy will be generated than that in an isothermal process. On the other hand, the heat transfer caused by an excessive temperature difference will also cause irreversible energy loss, which will lead to the decline of energy storage efficiency. For large-scale projects such as electric energy storage, the decline of energy storage efficiency means the rapid increase of costs, so the means and methods of temperature and pressure control during energy storage operation are particularly important.

SUMMARY

A device for isothermal compression, constant-pressure power generation and physical energy storage according to embodiments of a first aspect of the present disclosure includes an air storage tank, a weight, a piston and a piston rod. An upper part of an inner cavity of the air storage tank is divided into a first chamber, a second chamber and a third chamber by a first heat conducting baffle and a second heat conducting baffle, lower parts of the first chamber, the second chamber and the third chamber are communicated, a cavity enclosed by the first heat conducting baffle and inner walls of the air storage tank is designated as the first chamber, and a cavity enclosed by the first heat conducting baffle, the second heat conducting baffle and the inner wall of the air storage tank is designated as the second chamber, a cavity enclosed by the second heat conducting baffle and the inner walls of the air storage tank is designated as the third chamber, and the first chamber and the third chamber are symmetrical with respect to the second chamber. The piston capable of moving up and down is fitted arranged in the second chamber, a lower end of the piston rod is connected with the piston, and an upper end of the piston rod penetrates the top of the air storage tank and is connected with the weight. An inclined first elastic sealing belt is arranged in the first chamber, upper and lower ends of the first elastic sealing belt are fixed, the first elastic sealing belt divides the first chamber into two chambers in an up-down direction, and a side wall of the first elastic sealing belt is in sealing contact with the inner wall of the first chamber and configured to slide relative thereto; a second elastic sealing belt is arranged in the third chamber, and the second elastic sealing belt and the first elastic sealing belt are symmetrically arranged with respect to the second chamber. The first chamber is provided with a first water injection port and a first water outlet above the upper end of the first elastic sealing belt, and the third chamber is provided with a second water injection port and a second water outlet above an upper end of the second elastic sealing belt. A bottom of the air storage tank is provided with an air injection port and a compressed air outlet.

A system for isothermal compression, constant-pressure power generation and physical energy storage according to embodiments of a second aspect of the present disclosure includes a power generation system, a water injection system, an air compressing system and the above device for isothermal compression, constant-pressure power generation and physical energy storage according to the embodiments of the first aspect of the present disclosure. The power generation system includes at least one of a water turbine and an air turbine. A water outlet of the water injection system is connected with the first water injection port and the second water injection port, a water inlet of the water turbine is connected with the first water outlet and the second water outlet, and an outlet of the air compressing system is connected with the air injection port. The air injection port is provided with a first valve, the first water injection port is provided with a second valve, the second water injection port is provided with a third valve, the first water outlet is provided with a fourth valve, the second water outlet is provided with a fifth valve and the compressed air outlet is provided with a sixth valve, respectively; and a compressed air inlet of the air turbine is connected with an outlet of the sixth valve.

A method for isothermal compression, constant-pressure power generation and physical energy storage according to embodiments of a third aspect of the present disclosure, which is carried out by the above system for isothermal compression, constant-pressure power generation and physical energy storage according to the embodiments of the second aspect of the present disclosure, and includes an energy storage process and a power generation process. In the energy storage process, the air storage tank is filled with a compressed air with a preset pressure through an air compressing system, the air compressing system stops injecting the compressed air into the air storage tank after the air storage tank is full of the compressed air, and the first elastic sealing belt and the second elastic sealing belt swell upwards during the process of injecting the compressed air; then water is injected into the air storage tank through the first water injection port and the second water injection port by the water injection system to raise the weight until the compressed air in the second chamber reaches the preset pressure, and then the second valve and the third valve are closed; in the process of injecting the water, the first elastic sealing belt and the second elastic sealing belt move downwards, the water in the first chamber cools the compressed air in the second chamber through the first heat conducting baffle, and the water in the third chamber cools the compressed air in the second chamber through the second heat conducting baffle. The power generation process includes a first power generation process, a second power generation process and a third power generation process. In the first power generation process, the fourth valve and the fifth valve are opened, the compressed air in the air storage tank exerts a pressure on the water in the first chamber through the first elastic sealing belt, and exerts a pressure on the water in the third chamber through the second elastic sealing belt, the water in the first chamber flows out from the first water outlet, the water in the third chamber flows out from the second water outlet, and the water flowing out from the first water outlet and the second water outlet drives the water turbine to generate power; in the process that the water in the first chamber flows out from the first water outlet and the water in the third chamber flows out from the second water outlet, the water in the first chamber heats the compressed air in the second chamber through the first heat conducting baffle, and the water in the third chamber heats the compressed air in the second chamber through the second heat conducting baffle. In the second power generation process, the sixth valve is opened, and at this time, the fourth valve and the fifth valve are in a closed state, the compressed air in the air storage tank enters the air turbine through the compressed air outlet, and the air turbine generates power by using the compressed air. In the third power generation process, the first power generation process and the second power generation process are carried out simultaneously.

DETAILED DESCRIPTION

The present disclosure will be further explained with the attached drawings and examples.

Figure 2:
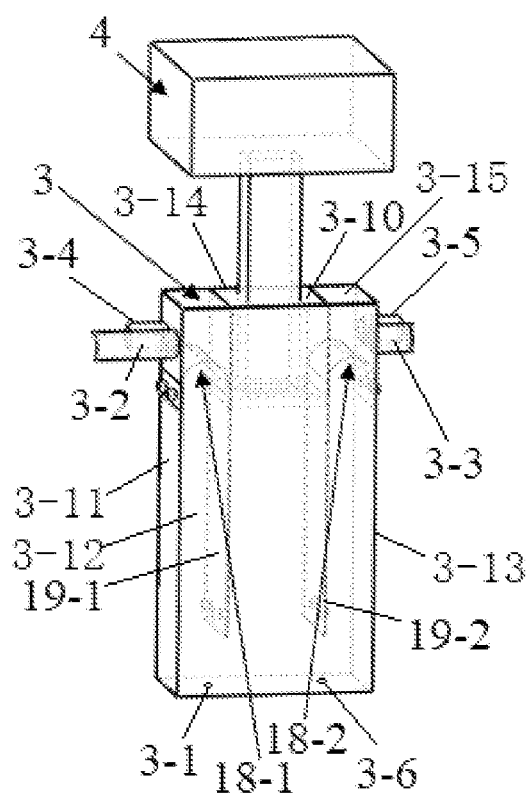
FIG. 2 is a schematic view of a device for isothermal compression, constant-pressure power generation and physical energy storage according to an embodiment of the present disclosure.
Figures 3, 4:
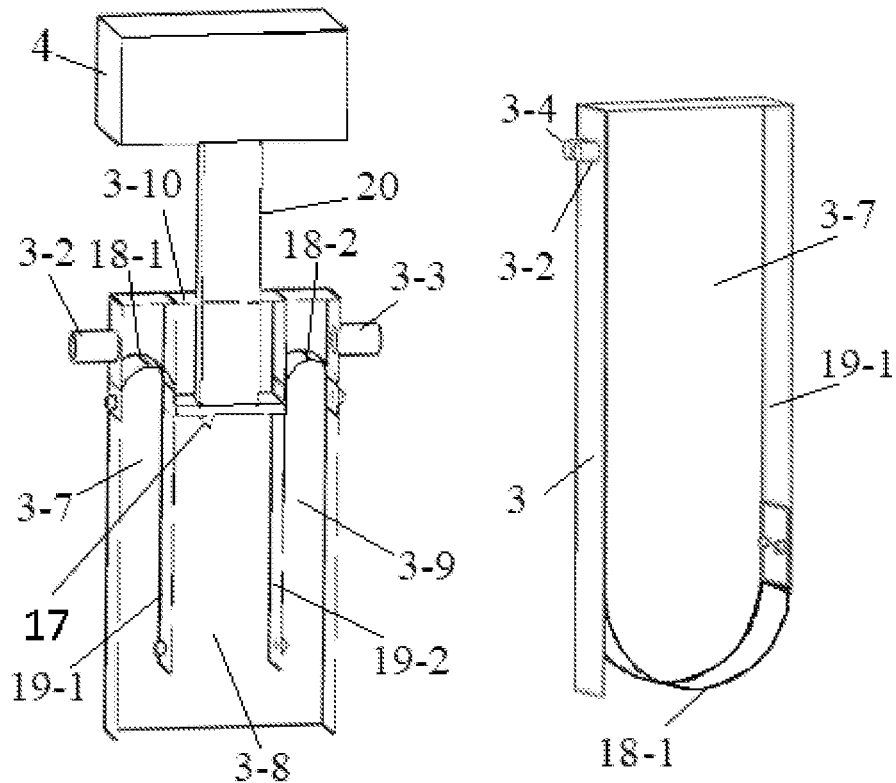
FIG. 3 is a longitudinal sectional view of a device for isothermal compression, constant-pressure power generation and physical energy storage according to an embodiment of the present disclosure.
FIG. 4 is a schematic view showing a deformed elastic sealing belt during energy storage according to an embodiment of the present disclosure.

Referring to FIGS. 2 and 3, the present disclosure relates to a device for isothermal compression, constant-pressure power generation and physical energy storage, which includes an air storage tank 3, a weight 4, a piston 17 and a piston rod 20. A shape of the air storage tank 3 is a cuboid, or an inner cavity of the air storage tank 3 is a cuboid structure. The following solution of the present disclosure will be described in the case that the shape of the air storage tank 3 is a cuboid and the inner cavity of the air storage tank 3 is a cuboid structure. Specifically, side surfaces of the air storage tank 3 are sequentially designated as a first side surface 3-11 (a left side surface shown in FIG. 2), a second side surface 3-12 (a front side surface shown in FIG. 2), a third side surface 3-13 (a right side surface shown in FIG. 2) and a fourth side surface 3-14 (a rear side surface shown in FIG. 2), the first side surface 3-11 is opposite to the third side surface 3-13 and the second side surface 3-12 is opposite the fourth side 3-14.

An upper part of the inner cavity of the air storage tank 3 is divided into a first chamber 3-7, a second chamber 3-8 and a third chamber 3-9 in sequence from left to right by a first heat conducting baffle 19-1 and a second heat conducting baffle 19-2, and lower parts of the first chamber 3-7, the second chamber 3-8 and the third chamber 3-9 are communicated. The first chamber 3-7 and the third chamber 3-9 are symmetrical with respect to the second chamber 3-8. Specifically, the first heat conducting baffle 19-1 and the second heat conducting baffle 19-2 are arranged between the first side surface 3-11 and the third side surface 3-13. The first heat conducting baffle 19-1, the second heat conducting baffle 19-2, the first side surface 3-11 and the third side surface 3-13 are parallel to each other, and the first heat conducting baffle 19-1 and the second heat conducting baffle 19-2 have the same height and thickness. The distance between the first heat conducting baffle 19-1 and the first side surface 3-11 is equal to the distance between the second heat conducting baffle 19-2 and the third side surface 3-13. A top surface 3-15, the second side surface 3-12 and the fourth side surface 3-14 of the air storage tank 3 are hermetically connected with the first heat conducting baffle 19-1. The top surface 3-15, the second side surface 3-12 and the fourth side surface 3-14 of the air storage tank 3 are hermetically connected with the second heat conducting baffle 19-2.

The piston 17 capable of moving up and down is fitted and arranged in the second chamber 3-8. The four side surfaces of the piston 17 are sealed with the first heat conducting baffle 19-1, the second side surface 3-12 of the air storage tank 3, the second heat conducting baffle 19-2 and the fourth side surface 3-14 of the air storage tank 3. A lower end of the piston rod 20 is connected with the piston 17, and an upper end of the piston rod 20 penetrates the top of the air storage tank 3 and is connected with the weight 4. Therefore, the processes of energy storage and power generation (i.e. energy release) can be realized through the rising and falling of the piston 17.

The inner cavity of the air storage tank 3 of the present disclosure has a left-right symmetrical structure. The purpose of this structure is to enable the air storage tank 3 to be stressed symmetrically in a left-right direction, so as to ensure the structural reliability of the whole device, and more importantly, to prevent the problem that the piston 17 cannot rise and fall normally due to the deformation of the four corresponding side walls of the second chamber 3-8.

Figure 5:
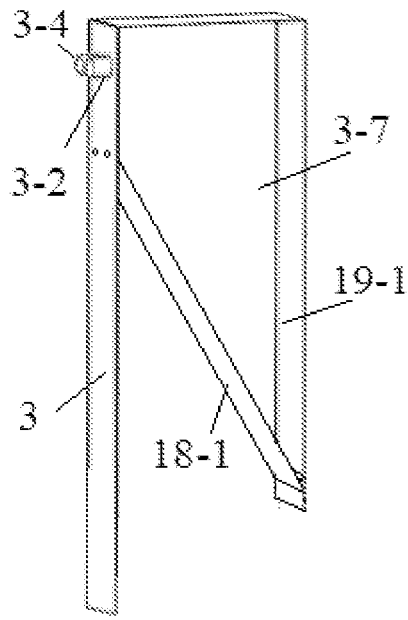
FIG. 5 is a schematic view of a first elastic sealing belt in a free state according to an embodiment of the present disclosure.

Referring to FIG. 5, an inclined first elastic sealing belt 18-1 is arranged in the first chamber 3-7, an upper end of the first elastic sealing belt 18-1 is fixedly connected with the first side surface 3-11, and a lower end of the first elastic sealing belt 18-1 is fixedly connected with a lower end of the first heat conducting baffle 19-1, so that the first elastic sealing belt 18-1 divides the first chamber 3-7 into two chambers in an up-down direction. Two side surfaces of the first elastic sealing belt 18-1 (i.e., a front side surface and a rear side surface of the first elastic sealing belt 18-1 shown in FIG. 2) are in sealing contact with the second side surface 3-12 and the fourth side surface 3-14 of the air storage tank 3, respectively, so that after the first elastic sealing belt 18-1 is compressed, the first elastic sealing belt 18-1 is always in sealing contact with the second side surface 3-12 and the fourth side surface 3-14 and can slide relative thereto. A second elastic sealing belt 18-2 is arranged in the third chamber 3-9. The second elastic sealing belt 18-2 and the first elastic sealing belt 18-1 are symmetrically arranged relative to the second chamber 3-8. The second elastic sealing belt 18-2 and the first elastic sealing belt 18-1 are completely symmetrical structures and are mounted in the same way. Specifically, an upper end of the second elastic sealing belt 18-2 is fixedly connected with the third side surface 3-13, a lower end of the second elastic sealing belt 18-2 is fixedly connected with a lower end of the second heat conducting baffle 19-2, and two side surfaces of the second elastic sealing belt 18-2 are in sealing contact with the second side surface 3-12 and the fourth side surface 3-14, respectively. The second elastic sealing belt 18-2 divides the third chamber 3-9 into two chambers in the up-down direction.

The first chamber 3-7 is provided with a first water injection port 3-2 and a first water outlet 3-4 above the upper end of the first elastic sealing belt 18-1. The third chamber 3-9 is provided with a second water injection port 3-3 and a second water outlet 3-5 above the upper end of the second elastic sealing belt 18-2. The bottom of the air storage tank 3 is provided with an air injection port 3-1 and a compressed air outlet 3-6.

In order to enable the air storage tank 3 to be symmetrically stressed and the strength of each corresponding part to tend to be close, the present disclosure preferably arranges the first water injection port 3-2 and the first water outlet 3-4 on the first side surface 3-11 to communicate with the first chamber 3-7, and arranges the second water injection port 3-3 and the second water outlet 3-5 on the third side surface 3-13 to communicate with the third chamber 3-9.

Referring to FIG. 2-FIG. 5, the working principle of the device for isothermal compression, constant-pressure power generation and physical energy storage according to the present disclosure is as follows.

In the process of energy storage, a compressed air can be injected into the air storage tank 3 from the air injection port 3-1, and the compressed air is filled in an area below the first elastic sealing belt 18-1 in the first chamber 3-7, the whole second chamber 3-8 and an area below the second elastic sealing belt 18-2 in the third chamber 3-9. With the continuous injection of the air, the first elastic sealing belt 18-1 and the second elastic sealing belt 18-2 are pushed up by the compressed air and finally swell up, and at this time, compression energy can be stored in the air storage tank 3. When these areas are filled with the compressed air, the injection of the compressed air into the air storage tank 3 is stopped. Then, water is injected into the air storage tank 3 through the first water injection port 3-2 and the second water injection port 3-3, and the injected water continuously presses down the first elastic sealing belt 18-1 and the second elastic sealing belt 18-2 with the increasing pressure. At the same time, the compressed air filled in the area below the first elastic sealing belt 18-1 in the first chamber 3-7, the whole second chamber 3-8 and the area below the second elastic sealing belt 18-2 in the third chamber 3-9 can be continuously compressed. With the increasing pressure of the compressed air, the piston 17 is pushed up, and the weight 4 is also lifted when the piston 17 moves upwards, thus realizing energy storage. In the process of water injection, the compressed air will be continuously compressed, and the energy will increase. At this time, the water on an upper right side of the first elastic sealing belt 18-1 will exchange heat with the compressed air in the second chamber 3-8 through the first heat conducting baffle 19-1 to cool the compressed air in the second chamber 3-8. At the same time, the water on an upper left side of the second elastic sealing belt 18-2 will exchange heat with the compressed air in the second chamber 3-8 through the second heat conducting baffle 19-2 to cool the compressed air in the second chamber 3-8. During the air compression, part of the compression heat will be stored in the water in the first chamber 3-7 and the third chamber 3-9. Since the water in the first chamber 3-7 and the third chamber 3-9 have heat exchange with the compressed air, and the heat exchange is in the form of countercurrent, the heat exchange effect is better, the temperature of the compressed air in the process of boosting can be well controlled, and the approximate isothermal compression process can be realized.

Referring to FIG. 4, due to the gravity of the water in the first chamber 3-7 and the third chamber 3-9 and the pressure exerted from the outside, the first elastic sealing belt 18-1 and the second elastic sealing belt 18-2 protrude downwards.

After the energy storage is completed, the present disclosure can release energy and generate power through the compressed air and the high-pressure water in the air storage tank 3, which can be specifically divided into the following three situations.

In a first situation, the water in the first chamber 3-7 and the third chamber 3-9 is led out from the first water outlet 3-4 and the second water outlet 3-5, which can be used to drive a water turbine to generate power. In the process that the water in the first chamber 3-7 flows out from the first water outlet 3-4, as shown in FIG. 4, the water in the first chamber 3-7 heats the compressed air in the second chamber 3-8 through the first heat conducting baffle 19-1, and similarly, the water in the third chamber 3-9 can heat the compressed air in the second chamber 3-8 through the second heat conducting baffle 19-2. The compressed air in the air storage tank 3 can absorb the heat in the water, and keep a relatively stable temperature, so that the approximately isothermal expansion of the compressed air can be realized.

In a second situation, the compressed air in the air storage tank 3 is introduced from the compressed air outlet 3-6 into a compressed air inlet of an air turbine 16, and the air turbine 16 uses the compressed air to generate power. In this process, the water in the first chamber 3-7 and the third chamber 3-9 uses the heat stored in the energy storage process to heat the compressed air, and the compressed air in the air storage tank can absorb the heat in the water, so as to keep the relatively stable temperature, thus realizing the approximately isothermal expansion of the compressed air.

In a third situation, the above first power generation process and second power generation process are carried out at the same time. According to the above description, in the third situation, the approximately isothermal expansion of the compressed air can also be realized.

In the device for isothermal compression, constant-pressure power generation and physical energy storage, the first elastic sealing belt and the second elastic sealing belt are respectively arranged in the first chamber and the third chamber, and the first elastic sealing belt and the second elastic sealing belt play the role of separating the compressed air from the water. In the energy storage process, the temperature of the compressed air in the air storage tank is increased due to being compressed, and the water in the first chamber and the third chamber can absorb the compression heat of the compressed air in the air storage tank by using the thermal conductivity of the first heat conducting baffle and the second heat conducting baffle, respectively. Therefore, the present disclosure can well control the temperature of the compressed air in the process of boosting and realize the approximately isothermal compression process. In the process of power generation, the water in the first chamber and the third chamber can transfer heat to the compressed air in the air storage tank through the first heat conducting baffle and the second heat conducting baffle, and the compressed air in the air storage tank absorbs the heat in the water, so as to realize the approximately isothermal expansion of the air. Moreover, the first elastic sealing belt and the second elastic sealing belt can also store the compressed air with a certain pressure in the air storage tank at the initial stage of energy storage, thus improving the energy storage capacity. As can be seen from the above, the present disclosure can solve the problems of large energy loss, low energy storage efficiency and poor economic benefits existing in the current air compression energy storage.

Figure 1:
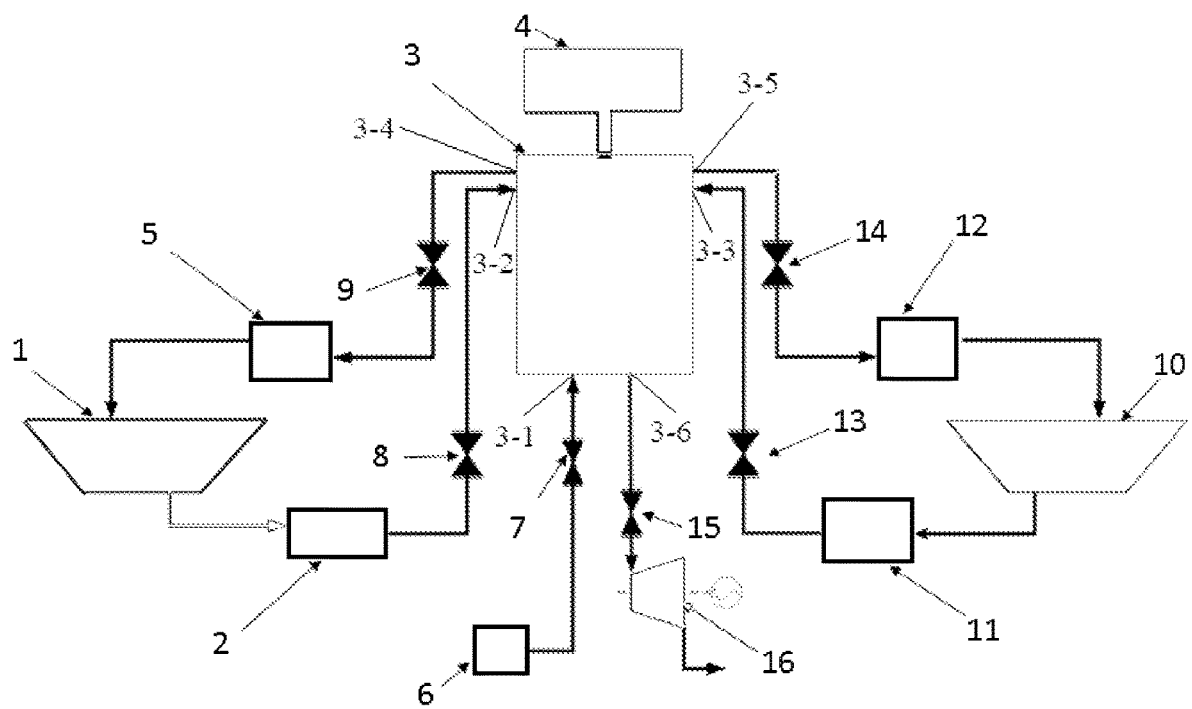
FIG. 1 is a schematic view of a system for isothermal compression, constant-pressure power generation and physical energy storage according to an embodiment of the present disclosure.

Referring to FIG. 1, a system for isothermal compression, constant-pressure power generation and physical energy storage of the present disclosure includes a power generation system, a water injection system, an air compressing system and the above device for isothermal compression, constant-pressure power generation and physical energy storage of the present disclosure. The power generation system includes at least one of a water turbine and an air turbine 16.

A water outlet of the water injection system is connected with the first water injection port 3-2 and the second water injection port 3-3, the water injection system can inject a pressurized water into the first chamber 3-7 and the third chamber 3-9, a water inlet of the water turbine is connected with the first water outlet 3-4 and the second water outlet 3-5, and an outlet of the air compressing system is connected with the water injection port 3-1. The air injection port 3-1 is provided with a first valve 7, the first water injection port 3-2 is provided with a second valve 8, the second water injection port 3-3 is provided with a third valve 13, the first water outlet 3-4 is provided with a fourth valve 9, the second water outlet 3-5 is provided with a fifth valve 14 and the compressed air outlet 3-6 is provided with a sixth valve 15. A compressed air inlet of the air turbine 16 is connected with an outlet of the sixth valve 15.

The working process of the system for isothermal compression, constant-pressure power generation and physical energy storage of the present disclosure includes an energy storage process and a power generation process, specifically as follows.

Referring to the energy storage process of the above device for isothermal compression, constant-pressure power generation and physical energy storage, the energy storage process of the system for isothermal compression, constant-pressure power generation and physical energy storage of the present disclosure is as follows. The compressed air with a preset pressure (for example, 1 MPa) is filled into the air storage tank 3 through the air compressing system, and the air compressing system stops injecting the compressed air into the air storage tank 3 after the air storage tank 3 is full of the compressed air. The first elastic sealing belt 18-1 and the second elastic sealing belt 18-2 swell upwards during the process of injecting the compressed air. Then, the water is injected into the air storage tank 3 through the first water injection port 3-2 and the second water injection port 3-3 by using the water injection system, so as to raise the weight 4 until the compressed air in the second chamber 3-8 reaches the preset pressure, and then the second valve 8 and the third valve 13 are closed. In the process of injecting the water, the first elastic sealing belt 18-1 and the second elastic sealing belt 18-2 move downwards, and the water in the first chamber 3-7 cools the compressed air in the second chamber 3-8 through the first heat conducting baffle 19-1, and the water in the third chamber 3-9 cools the compressed air in the second chamber 3-8 through the second heat conducting baffle 19-2.

Referring to the energy release and power generation process of the device for isothermal compression, constant-pressure power generation and physical energy storage of the present disclosure, the power generation process of the system for isothermal compression, constant-pressure power generation and physical energy storage of the present disclosure includes a first power generation process, a second power generation process and a third power generation process, as follows.

In the first power generation process, the fourth valve 9 and the fifth valve 14 are opened, the compressed air in the air storage tank 3 exerts a pressure on the water in the first chamber 3-7 through the first elastic sealing belt 18-1, and also exerts a pressure on the water in the third chamber 3-9 through the second elastic sealing belt 18-2, the water in the first chamber 3-7 flows out from the first water outlet 3-4, the water in the third chamber 3-9 flows out through the second water outlet 3-5, and the water flowing out from the first water outlet 3-4 and the second water outlet 3-5 drives the water turbine to generate power. In the process that the water in the first chamber 3-7 flows out from the first water outlet 3-4 and the water in the third chamber 3-9 flows out from the second water outlet 3-5, the water in the first chamber 3-7 heats the compressed air in the second chamber 3-8 through the first heat conducting baffle 19-1, and the water in the third chamber 3-9 heats the compressed air in the second chamber 3-8 through the second heat conducting baffle 19-2.

In the second power generation process, the sixth valve 15 is opened, and at this time, the fourth valve 9 and the fifth valve 14 are in a closed state. The compressed air in the air storage tank 3 enters the air turbine 16 through the compressed air outlet 3-6, and the air turbine 16 uses the compressed air to generate power.

In the third power generation process, the first power generation process and the second power generation process are carried out simultaneously.

Referring to FIG. 1, in the system for isothermal compression, constant-pressure power generation and physical energy storage of the present disclosure, the water turbine can be configured in the form of a water turbine set, that is, the water turbine adopts a first water turbine 5 and a second water turbine 12. A water inlet of the first water turbine 5 is connected with an outlet of the fourth valve 9, and a water inlet of the second water turbine 12 is connected with an outlet of the fifth valve 14. The water injection system can adopt the form of a water pump set, that is, the water injection system adopts a first water pump 2 and a second water pump 11, a water outlet of the first water pump 2 is connected with an inlet of the second valve 8, and a water outlet of the second water pump 11 is connected with an inlet of the third valve 13. The first water pump 2 can inject the high-pressure water into the first chamber 3-7, and the second water pump 11 can inject the high-pressure water into the third chamber 3-9. The system for isothermal compression, constant-pressure power generation and physical energy storage can also include a water pool, a water outlet of the water turbine is connected with the water pool, the water discharged from the water turbine can be collected in the water pool, and a water inlet of the water injection system is connected with the water pool, so that the water injection system can reuse the water in the water pool and inject the water into the first chamber 3-7 and the third chamber 3-9. Of course, two pools can be provided in the present disclosure, which are a first pool 1 and a second pool 10, respectively. The first water turbine 5 and the first water pump 2 share the first pool 1, and the second water turbine 12 and the second water pump 11 share the second pool 10. The air compressing system of the present disclosure can use an air compressor 6.

As can be seen from the above solution, the present disclosure has the advantages of simple working processes and mature equipment, so that the investment cost is relatively low with high energy storage efficiency and good economic benefits. Moreover, the present disclosure completely solves the problems of large energy loss, complex processes, immature equipment, high investment costs, low energy storage efficiency and poor economic benefits existing in the current air compression energy storage.

The invention claimed is:

1. A device for isothermal compression, constant-pressure power generation and physical energy storage, comprising an air storage tank, a weight, a piston and a piston rod,
    wherein an upper part of an inner cavity of the air storage tank is divided into a first chamber, a second chamber and a third chamber by a first heat conducting baffle and a second heat conducting baffle, lower parts of the first chamber, the second chamber and the third chamber are communicated, a cavity enclosed by the first heat conducting baffle and inner walls of the air storage tank is designated as the first chamber, a cavity enclosed by the first heat conducting baffle, the second heat conducting baffle and the inner walls of the air storage tank is designated as the second chamber, a cavity enclosed by the second heat conducting baffle and the inner walls of the air storage tank is designated as the third chamber, and the first chamber and the third chamber are symmetrical with respect to the second chamber;
    the piston is fitted and arranged in the second chamber and configured to move up and down, a lower end of the piston rod is connected with the piston, and an upper end of the piston rod penetrates the top of the air storage tank and is connected with the weight;
    an inclined first elastic sealing belt is arranged in the first chamber, upper and lower ends of the first elastic sealing belt are fixed, the first elastic sealing belt divides the first chamber into two chambers in an up-down direction, and a side wall of the first elastic sealing belt is in sealing contact with an inner wall of the first chamber and configured to slide relative thereto; a second elastic sealing belt is arranged in the third chamber, and the second elastic sealing belt and the first elastic sealing belt are symmetrically arranged with respect to the second chamber;
    the first chamber comprises a first water injection port and a first water outlet above the upper end of the first elastic sealing belt, and the third chamber comprises a second water injection port and a second water outlet above an upper end of the second elastic sealing belt; and
    a bottom of the air storage tank comprises an air injection port and a compressed air outlet.

2. The device for isothermal compression, constant-pressure power generation and physical energy storage according to claim 1, wherein a shape of the air storage tank is a cuboid, side surfaces of the air storage tank are sequentially designated as a first side surface, a second side surface, a third side surface and a fourth side surface, the first side is opposite to the third side, and the second side is opposite to the fourth side;
    the first heat conducting baffle and the second heat conducting baffle are arranged between the first side surface and the third side surface, the first heat conducting baffle, the second heat conducting baffle, the first side surface and the third side surface are parallel to each other, the first heat conducting baffle and the second heat conducting baffle have the same height and thickness, and a distance between the first heat conducting baffle and the first side surface is equal to a distance between the second heat conducting baffle and the third side surface;
    a top surface, the second side surface and the fourth side surface of the air storage tank are hermetically connected with the first heat conducting baffle, and the top surface, the second side surface and the fourth side surface of the air storage tank are hermetically connected with the second heat conducting baffle;
    the upper end of the first elastic sealing belt is fixedly connected with the first side surface, the lower end of the first elastic sealing belt is fixedly connected with a lower end of the first heat conducting baffle, and two side surfaces of the first elastic sealing belt are in sealing contact with the second side surface and the fourth side surface, respectively; and
    an upper end of the second elastic sealing belt is fixedly connected with the third side surface, a lower end of the second elastic sealing belt is fixedly connected with a lower end of the second heat conducting baffle, and two side surfaces of the second elastic sealing belt are in sealing contact with the second side surface and the fourth side surface, respectively.

3. The device for isothermal compression, constant-pressure power generation and physical energy storage according to claim 2, wherein the first water injection port and the first water outlet are arranged on the first side surface and communicate with the first chamber; and
    the second water injection port and the second water outlet are arranged on the third side surface and communicate with the third chamber.

4. A system for isothermal compression, constant-pressure power generation and physical energy storage, comprising a power generation system, a water injection system, an air compressing system and a device for isothermal compression, constant-pressure power generation and physical energy storage, and the power generation system comprising at least one of a water turbine and an air turbine,
    wherein the device for isothermal compression, constant-pressure power generation and physical energy storage, comprises an air storage tank, a weight, a piston and a piston rod,
    an upper part of an inner cavity of the air storage tank is divided into a first chamber, a second chamber and a third chamber by a first heat conducting baffle and a second heat conducting baffle, lower parts of the first chamber, the second chamber and the third chamber are communicated, a cavity enclosed by the first heat conducting baffle and inner walls of the air storage tank is designated as the first chamber, a cavity enclosed by the first heat conducting baffle, the second heat conducting baffle and the inner walls of the air storage tank is designated as the second chamber, a cavity enclosed by the second heat conducting baffle and the inner walls of the air storage tank is designated as the third chamber, and the first chamber and the third chamber are symmetrical with respect to the second chamber;

the piston is fitted and arranged in the second chamber and configured to move up and down, a lower end of the piston rod is connected with the piston, and an upper end of the piston rod penetrates the top of the air storage tank and is connected with the weight;

an inclined first elastic sealing belt is arranged in the first chamber, upper and lower ends of the first elastic sealing belt are fixed, the first elastic sealing belt divides the first chamber into two chambers in an up-down direction, and a side wall of the first elastic sealing belt is in sealing contact with an inner wall of the first chamber and configured to slide relative thereto; a second elastic sealing belt is arranged in the third chamber, and the second elastic sealing belt and the first elastic sealing belt are symmetrically arranged with respect to the second chamber;

the first chamber comprises a first water injection port and a first water outlet above the upper end of the first elastic sealing belt, and the third chamber comprises a second water injection port and a second water outlet above an upper end of the second elastic sealing belt; and a bottom of the air storage tank comprises an air injection port and a compressed air outlet, wherein a water outlet of the water injection system is connected with the first water injection port and the second water injection port, a water inlet of the water turbine is connected with the first water outlet and the second water outlet, and an outlet of the air compressing system is connected with the air injection port;

the air injection port is provided with a first valve, the first water injection port is provided with a second valve, the second water injection port is provided with a third valve, the first water outlet is provided with a fourth valve, the second water outlet is provided with a fifth valve and the compressed air outlet is provided with a sixth valve; and a compressed air inlet of the air turbine is connected with an outlet of the sixth valve.

5. The system for isothermal compression, constant-pressure power generation and physical energy storage according to claim 4, wherein the water turbine comprises a first water turbine and a second water turbine, a water inlet of the first water turbine is connected with an outlet of the fourth valve, and a water inlet of the second water turbine is connected with an outlet of the fifth valve.

6. The system for isothermal compression, constant-pressure power generation and physical energy storage according to claim 4, wherein the water injection system comprises a first water pump and a second water pump, a water outlet of the first water pump is connected with an inlet of the second valve, and a water outlet of the second water pump is connected with an inlet of the third valve.

7. The system for isothermal compression, constant-pressure power generation and physical energy storage according to claim 4, further comprising a water pool, wherein a water outlet of the water turbine is connected with the water pool, and a water inlet of the water injection system is connected with the water pool.

8. A method for isothermal compression, constant-pressure power generation and physical energy storage, wherein the method for isothermal compression, constant-pressure power generation and physical energy storage is carried out by a system for isothermal compression, constant-pressure power generation and physical energy storage, and comprises an energy storage process and a power generation process, wherein the system for isothermal compression, constant-pressure power generation and physical energy storage comprises a power generation system, a water injection system, an air compressing system and a device for isothermal compression, constant-pressure power generation and physical energy storage, and the power generation system comprising at least one of a water turbine and an air turbine, wherein the device for isothermal compression, constant-pressure power generation and physical energy storage, comprises an air storage tank, a weight, a piston and a piston rod, an upper part of an inner cavity of the air storage tank is divided into a first chamber, a second chamber and a third chamber by a first heat conducting baffle and a second heat conducting baffle, lower parts of the first chamber, the second chamber and the third chamber are communicated, a cavity enclosed by the first heat conducting baffle and inner walls of the air storage tank is designated as the first chamber, a cavity enclosed by the first heat conducting baffle, the second heat conducting baffle and the inner walls of the air storage tank is designated as the second chamber, a cavity enclosed by the second heat conducting baffle and the inner walls of the air storage tank is designated as the third chamber, and the first chamber and the third chamber are symmetrical with respect to the second chamber;

the piston is fitted and arranged in the second chamber and configured to move up and down, a lower end of the piston rod is connected with the piston, and an upper end of the piston rod penetrates the top of the air storage tank and is connected with the weight;

an inclined first elastic sealing belt is arranged in the first chamber, upper and lower ends of the first elastic sealing belt are fixed, the first elastic sealing belt divides the first chamber into two chambers in an up-down direction, and a side wall of the first elastic sealing belt is in sealing contact with an inner wall of the first chamber and configured to slide relative thereto; a second elastic sealing belt is arranged in the third chamber, and the second elastic sealing belt and the first elastic sealing belt are symmetrically arranged with respect to the second chamber;

the first chamber comprises a first water injection port and a first water outlet above the upper end of the first elastic sealing belt, and the third chamber comprises a second water injection port and a second water outlet above an upper end of the second elastic sealing belt; and a bottom of the air storage tank comprises an air injection port and a compressed air outlet, wherein a water outlet of the water injection system is connected with the first water injection port and the second water injection port, a water inlet of the water turbine is connected with the first water outlet and the second water outlet, and an outlet of the air compressing system is connected with the air injection port;

the air injection port is provided with a first valve, the first water injection port is provided with a second valve, the second water injection port is provided with a third valve, the first water outlet is provided with a fourth valve, the second water outlet is provided with a fifth valve and the compressed air outlet is provided with a sixth valve; and a compressed air inlet of the air turbine is connected with an outlet of the sixth valve, wherein in the energy storage process, the air storage tank is filled with a compressed air with a preset pressure through the air compressing system, the air compressing system stops injecting the compressed air into the air storage tank after the air storage tank is full of the compressed air, and the first elastic sealing belt and the second elastic sealing belt swell upwards during the process of injecting the compressed air; then water is injected into the air storage tank through the first water injection port and the second water injection port by the water injection system to raise the weight until the compressed air in the second chamber reaches the preset pressure, and then the second valve and the third valve are closed; in the process of injecting the water, the first elastic sealing belt and the second elastic sealing belt move downwards, the water in the first chamber cools the compressed air in the second chamber through the first heat conducting baffle, and the water in the third chamber cools the compressed air in the second chamber through the second heat conducting baffle;

wherein the power generation process comprises a first power generation process, a second power generation process and a third power generation process, in the first power generation process, the fourth valve and the fifth valve are opened, the compressed air in the air storage tank exerts a pressure on the water in the first chamber through the first elastic sealing belt, and exerts a pressure on the water in the third chamber through the second elastic sealing belt, the water in the first chamber flows out from the first water outlet, the water in the third chamber flows out from the second water outlet, and the water flowing out from the first water outlet and the second water outlet drives the water turbine to generate power; in the process that the water in the first chamber flows out from the first water outlet and the water in the third chamber flows out from the second water outlet, the water in the first chamber heats the compressed air in the second chamber through the first heat conducting baffle, and the water in the third chamber heats the compressed air in the second chamber through the second heat conducting baffle;

in the second power generation process, the sixth valve is opened, the fourth valve and the fifth valve are in a closed state, the compressed air in the air storage tank enters the air turbine through the compressed air outlet, and the air turbine generates power by using the compressed air; and in the third power generation process, the first power generation process and the second power generation process are carried out simultaneously.

* * * * *